Feb. 13, 1940. L. E. VAUGHN Re. 21,354
PIPE TONGS.
Original Filed May 18, 1936 4 Sheets-Sheet 1
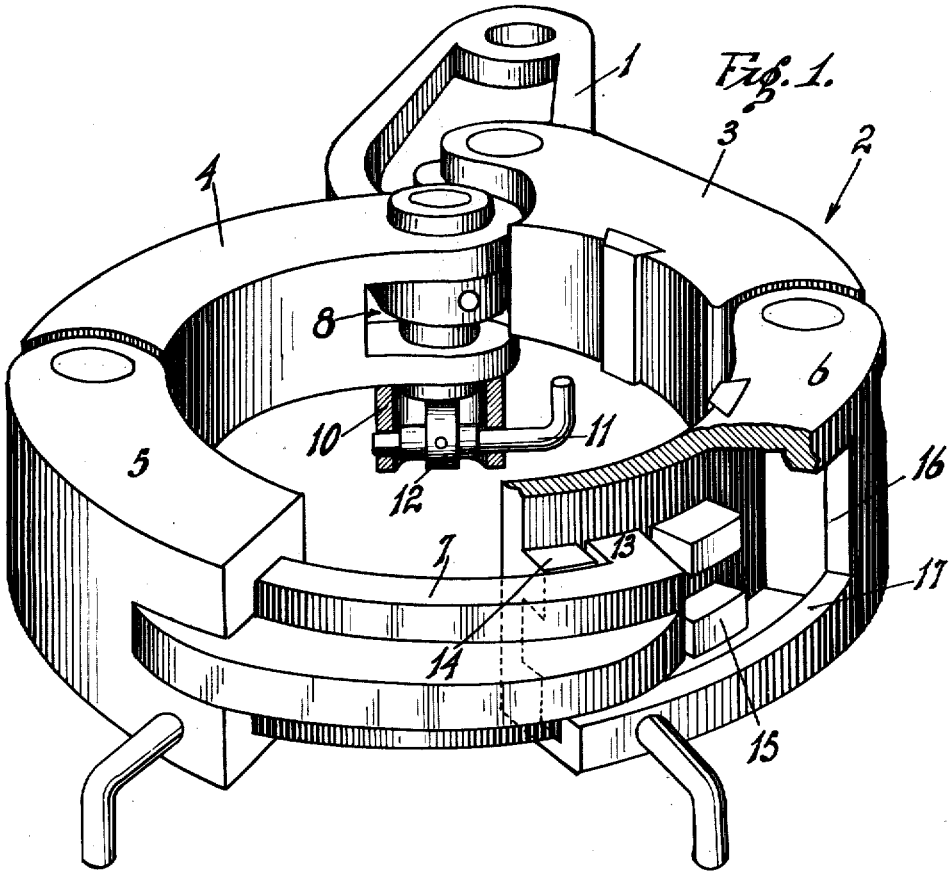
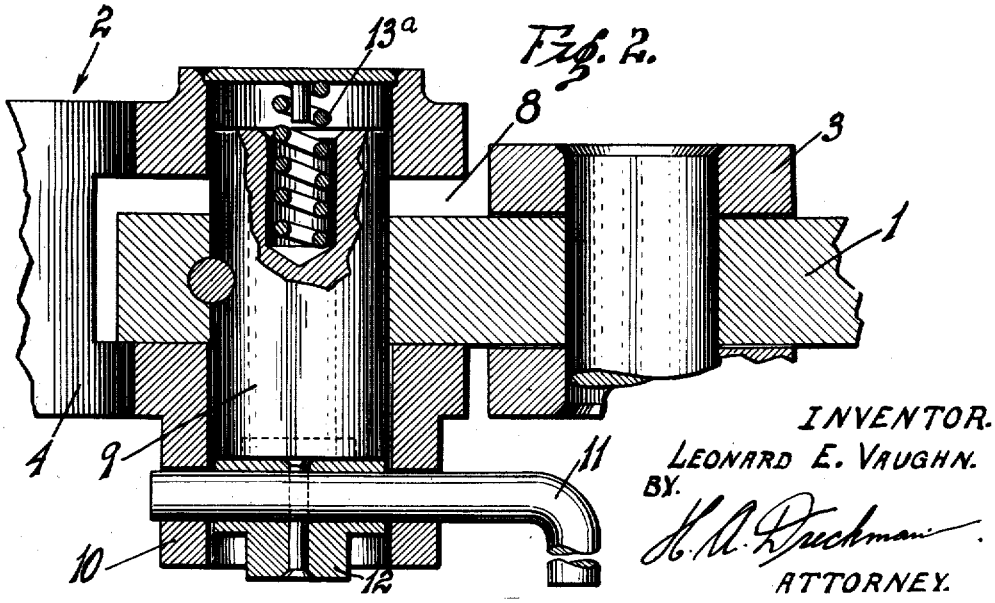
INVENTOR.
LEONARD E. VAUGHN.
BY. H. A. Duckman
ATTORNEY.

PIPE TONGS
Original Filed May 18, 1936 4 Sheets-Sheet 2
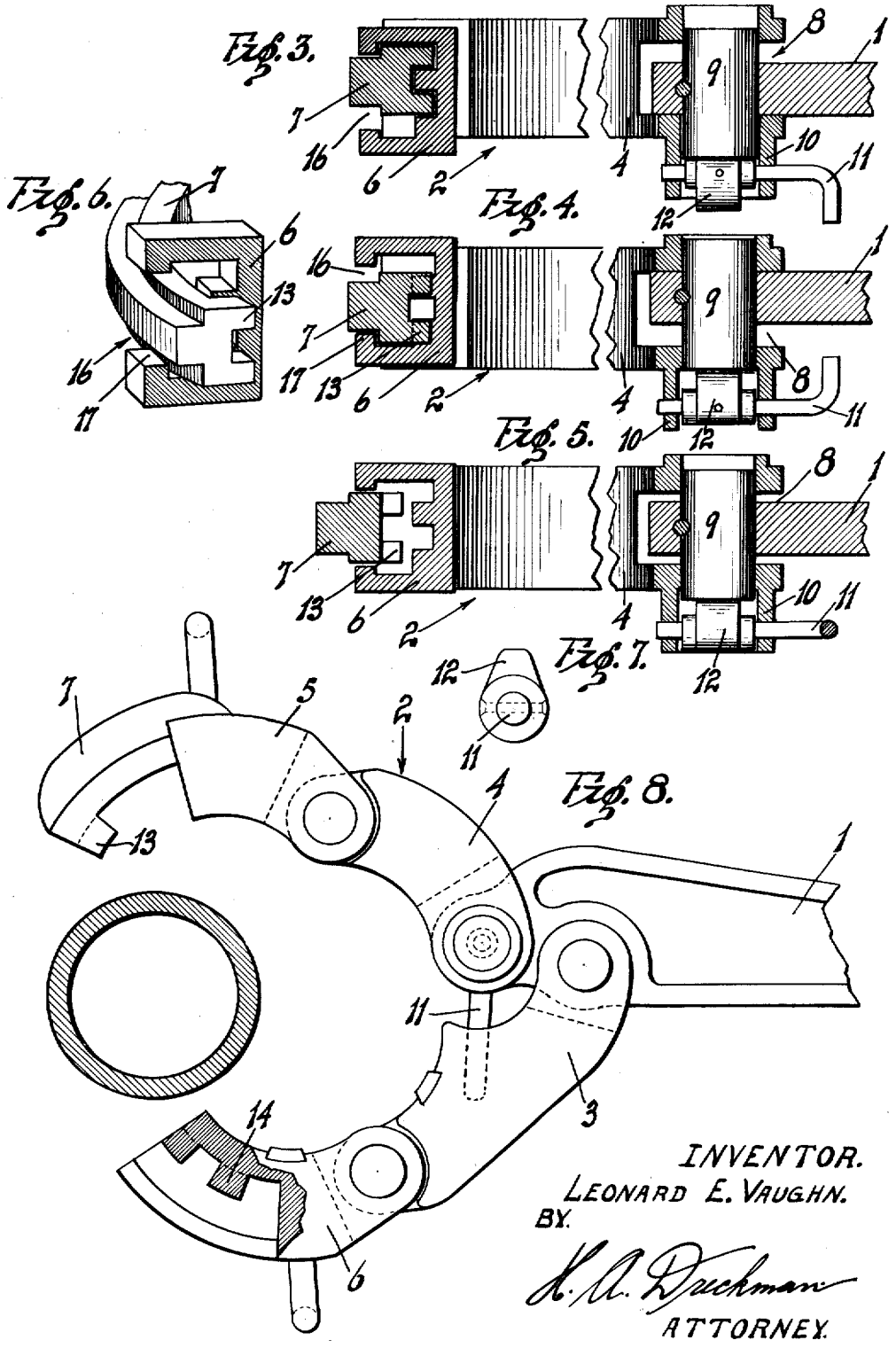
INVENTOR.
LEONARD E. VAUGHN.
BY
H. A. Duckman
ATTORNEY.

Feb. 13, 1940. L. E. VAUGHN Re. 21,354

PIPE TONGS

Original Filed May 18, 1936 4 Sheets-Sheet 3

INVENTOR.
LEONARD E. VAUGHN.
BY.
H. A. Duckman
ATTORNEY.

Feb. 13, 1940. L. E. VAUGHN Re. 21,354

PIPE TONGS

Original Filed May 18, 1936 4 Sheets-Sheet 4

INVENTOR.
LEONARD E. VAUGHN.
BY.
H. A. Duckman
ATTORNEY.

Reissued Feb. 13, 1940

Re. 21,354

UNITED STATES PATENT OFFICE 21,354

PIPE TONGS

Leonard E. Vaughn, Los Angeles, Calif., assignor to Patco, Inc., Los Angeles, Calif., a corporation of California Original No. 2,093,788, dated September 21, 1937, Serial No. 80,358, May 18, 1936. Application for reissue March 5, 1938, Serial No. 194,211

8 Claims. (Cl. 81—66)

This invention relates to tongs of the type, such as pipe or casing tongs which are used in handling well casing, tubing, and the like, and particularly in oil wells.

An object of my invention is to provide a device of this general character which is strong and effective, and which can be quickly and easily latched and unlatched about the casing or pipe, and one which will not easily break and thus endanger the life of the operator. Tongs heretofore in use have been cumbersome to operate and the parts thereof have frequently broken, and the latching mechanism used to secure the jaws about the pipe or casing frequently unlatched, all of which seriously endangered the life of the operator. In my invention, the pipe-engaging jaws are positively locked about the pipe or casing by a relative vertical movement of one or more jaws, this vertical movement being manually accomplished, and when the jaws are in locked position, a movement of the manually operated mechanism is necessary before the jaws are released for withdrawal from the pipe or casing.

A further object of my invention is to provide tongs of the general character stated in which the latch heretofore in use is eliminated.

A feature of my invention is the provision of a device of the character specified, which can be easily and conveniently locked and unlocked and to lock the device it is merely necessary to manually move a lever. This same lever also acts to release the tongs. This arrangement increases the speed with which the tongs can be operated.

Other objects, advantages and features of invention may appear from the accompanying drawings, the subjoined detailed description, and the appended claims.

In the drawings:

Fig. 1 is a perspective view of my tongs with parts broken away to show interior construction.

Fig 2 is a fragmentary transverse sectional view of the mounting pin and mechanism whereby a jaw is moved vertically relative to the other jaws.

Fig. 3 is a fragmentary transverse sectional view of the vertically movable jaw and actuating means therefor, with the jaw in engaging position.

Fig. 4 is a view similar to Fig. 3, with jaw in engaged position.

Fig. 5 is a view similar to Fig. 3, with the jaw in disengaging position.

Fig. 6 is a fragmentary perspective view, diagrammatic in nature, showing the locking finger in engaged position in the keeper jaw.

Fig. 7 is a side elevation of the operating cam.

Fig. 8 is a plain view of the tongs in position to encircle the pipe, with parts broken away to show interior construction.

Figure 9:
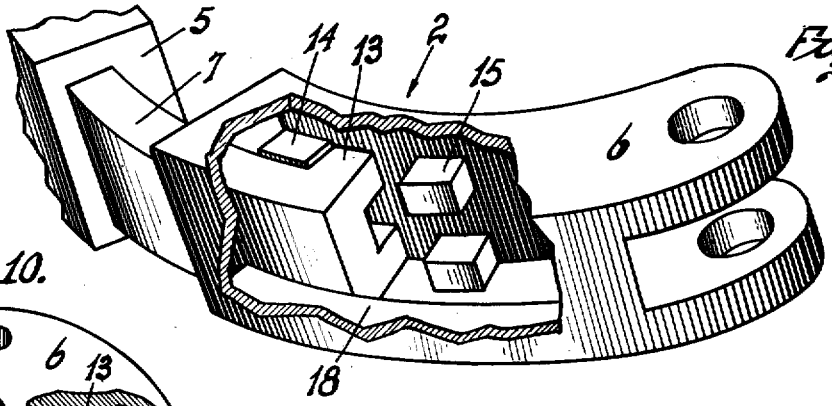
Fig. 9 is a fragmentary perspective view of a modified form of keeper jaw, the locking finger being shown in engaged position.

Referring more particularly to the drawings, in my tongs, one jaw or set of jaws is mounted on the handle and is movable in a horizontal plane, as well as being vertically movable relative to the other jaws, thereby moving one jaw or set of jaws into and out of locking position with the other jaw or set of jaws.

The numeral 1 indicates the handle at the inner end of which is mounted the pipe or the casing-engaging mechanism 2. The handle 1 is of the usual elongated type, such as is generally used in devices of this character. While I have here illustrated the casing-engaging mechanism as consisting of a plurality of pivotally mounted jaws, it is obvious that the number of these jaws can be varied so long as the jaws can be moved horizontally to engage and disengage the pipe or casing.

Considering Figs. 1 to 15, inclusive, the casing-engaging means comprises two oppositely disposed inner jaws 3 and 4, a locking jaw 5, and a keeper jaw 6. The locking jaw is provided with a locking finger 7. The inner jaws are pivotally attached to the handle 1 and the locking jaw 5 and keeper jaw 6 are either pivotally or fixedly attached to the jaws 4 and 3, respectively. The locking finger 7 is caused to engage and disengage the keeper jaw, as will be further described.

The engagement and disengagement of the locking finger is accomplished by the vertical movement of the jaws 4 and 5 by means of the following arrangment: The inner end of the jaw 4 is bifurcated, as shown at 8; the inner end of the handle 1 fits into the bifurcaton 8 and this bifurcation is greater than the thickness of the handle thereby permitting vertical movement of the jaw 4. A pin 9 is fixedly mounted in the handle 1 and this pin extends through the jaw 4 at its bifurcated end whereby the jaw is guided in its vertical movement, as will be further described.

An apron 10 depends from the jaw 4 at its bifurcated end, and the handle 11 is journaled in the apron. A cam 12 is fixedly attached to the handle 11 and on rotation of this handle the cam will bear against the bottom of the pin 9.

A coil spring 13a bears against the upper wing of the bifurcation, thereby urging the jaw 4 into raised position, as shown in Fig. 2. When the handle 11 is rotated to move the cam 12 into engagement with the bottom of the pin 9, the jaws 4, 5 will be moved downwardly, thereby carrying the locking finger 7 into locked position, as shown in Figs. 1 and 4. When it is desired to release the tongs, the handle 11 is again rotated so that the dwell of the cam moves away from the pin whereupon the jaws 4, 5 are moved upwardly, and the locking finger 7 disengages the keeper jaw.

Figure 14:
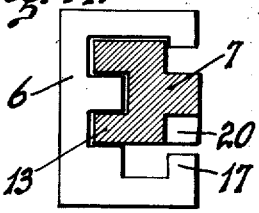
Fig. 14 is a view similar to Fig. 13 but with the locking finger about to engage the jaw.
Figure 15:
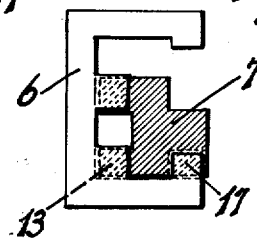
Fig. 15 is a view similar to Fig. 13 but with the locking finger in engaged position.

The inter-connecting engagement of the locking finger and the keeper jaw may be effected in the following manner: The locking finger 7 is provided with one or more inwardly extending lugs 13 and these lugs are moved into or out of engagement with keeper lugs 14 which project from the inner wall of keeper jaw 6. The lugs 13 are preferably spaced vertically, as are also the keeper lugs 14. Thus, in the raised position of the locking finger 7, the lugs 13 will pass over the keeper lugs 14, as shown in Figs. 3, 10 and 14, and after the pipe has been encircled by the jaws, a downward movement of the jaws 4, 5, will then move the lugs 13 back of the keeper lugs 14, as shown in Figs. 1, 4, 6, 9, 11, and 15.

To accommodate different sized pipes, I may provide spaced sets of keeper lugs on the jaw 6, such as are shown at 15.

As shown in Figs. 1 to 8, inclusive, the locking finger 7 can swing into the keeper jaw 6 through a horizontal slot 16. A rib 17 adjacent the bottom of the jaw 6 is so spaced from the inner wall of the jaw that the locking finger 7 will engage this rib when in lowered and locked position, thus holding the locking finger against accidental outward movement while the tongs are being used.

Figure 10:
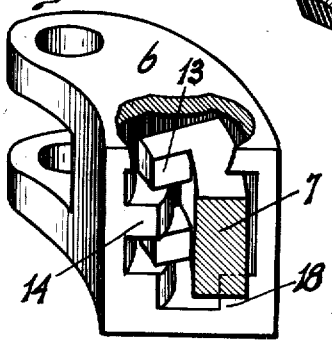
Fig. 10 is a fragmentary perspective view of the keeper jaw shown in Fig. 9, and with the locking finger about to engage the jaw.
Figure 11:
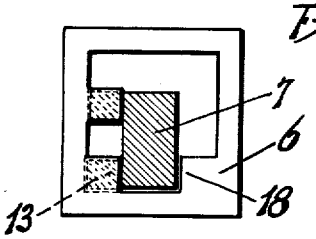
Fig. 11 is an end view of the keeper jaw shown in Fig. 9, with the locking finger in engaged position.
Figure 12:
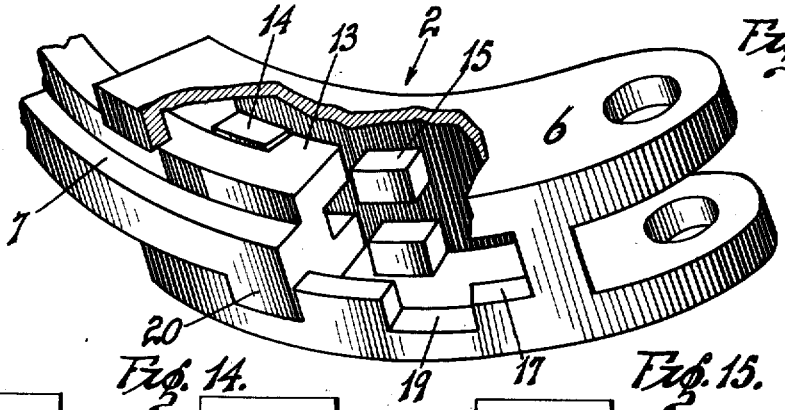
Fig. 12 is a fragmentary perspective view of still another type of keeper jaw and locking finger.
Figure 13:
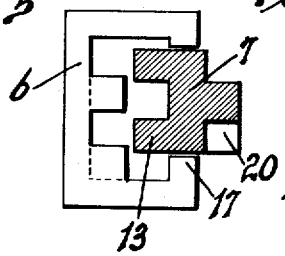
Fig. 13 is an end view of the keeper jaw shown in Fig. 12, with the locking finger entering the jaw.

In Figs. 9 to 11, inclusive, the slot 16 is eliminated and the jaw 6 is cored out. In this arrangement, the locking finger enters the jaw from the end and then moves vertically into locked position, the same as previously described. The rib 18 in the bottom of the jaw is engaged by the locking finger to keep this finger from disengaging the keeper lugs 14.

In Figs. 12 to 15, inclusive, I have shown still another type of keeper jaw and locking finger. The rib 17 is provided with a plurality of notches 19 which notches are adapted to receive a depending lug 20 on the locking finger. With this arrangement, I provide a type of T-head lock in which interengaging lugs are provided on both the inner and outer set of locking fingers.

From the foregoing description, it will be evident that both of the jaws 4, 5 are moved vertically in order to latch and unlatch the tongs.

Figure 16:
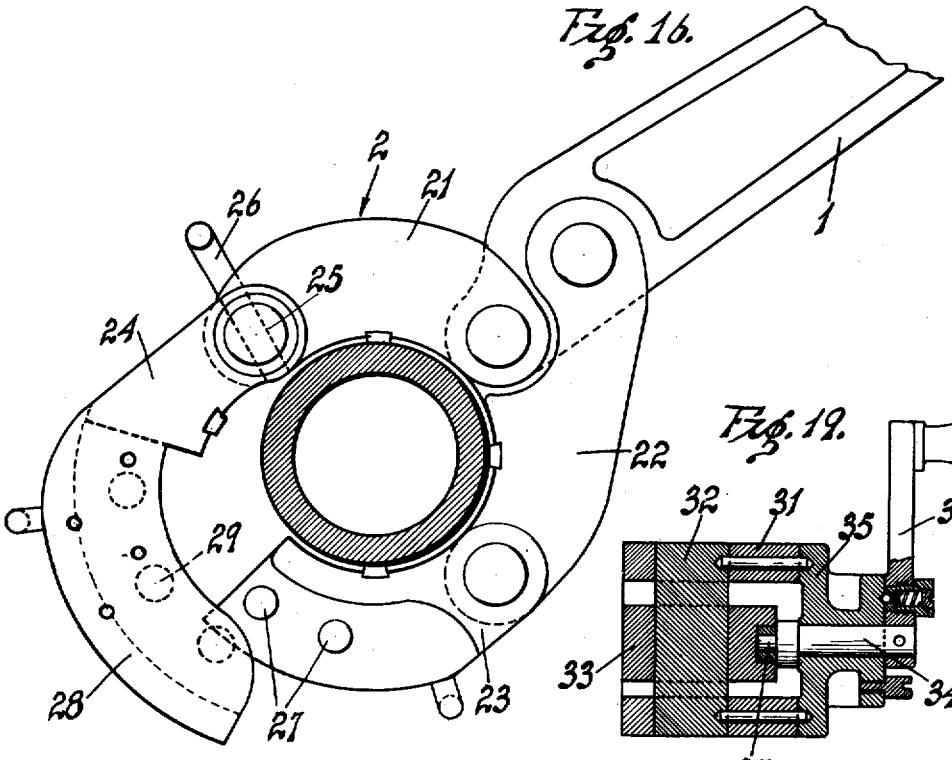
Fig. 16 is a plan view of the tongs with another type of keeper jaw and locking finger.
Figure 17:
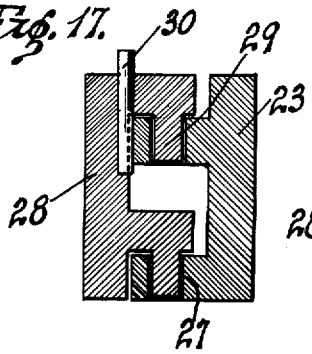
Fig. 17 is a transverse sectional view of the keeper jaw and locking finger shown in Fig. 16, with parts in engaged position.
Figure 18:
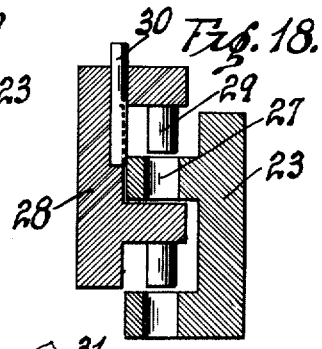
Fig. 18 is a view similar to Fig. 17, with parts shown in engaging position.

In Figs. 16 to 18, inclusive, I provide an inner pair of oppositely arranged jaws 21, 22. Each of these jaws is pivotally attached to the inner end of the handle 1. A keeper jaw or tip 23 is pivotally or fixedly attached to the outer end of the jaw 22. A latching jaw 24 is pivotally attached to the outer end of the jaw 21. In this modification, a structure substantially identical to that shown in Fig. 2 is provided at the pivot 25 between the jaws 21, 24. That is, the inner end of the jaw 24 is bifurcated and slides on the pin 25. The pin 25 is identical to 9. The same handle arrangement 26 is provided substantially identical to the handle 11. The cam operating means, as previously described, is here employed whereby only the jaw 24 is moved vertically in order to latch and unlatch the tongs.

The outer end of the jaw 23 is provided with a plurality of spaced holes 27. A locking finger 28 is provided with downwardly extending pins 29 which fit into the holes 27. Thus, in order to latch the tongs, the finger 28 is swung inwardly until the pins 29 are aligned with the holes 27. Then, by rotating the handle 26, the jaw 24 is lowered and the pins 29 enter the holes 27, as shown in Fig. 17.

For the purpose of aligning the pins 29 and the holes 27, I may use removable dowel pins 30 in the finger 28. These dowels engage the edge of the keeper jaw 23 when the pins 29 are in a position to be lowered into the holes 27.

Figure 19:
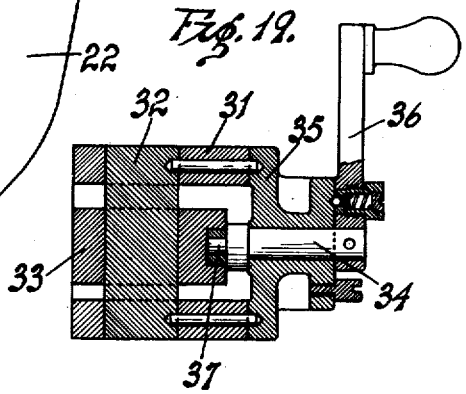
Fig. 19 is a transverse sectional view of one of the jaws of the tongs, illustrating a modified form of moving means for the jaw.
Figure 20:
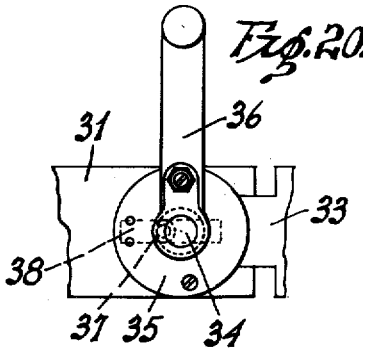
Fig. 20 is a fragmentary side elevation of the actuating means shown in Fig. 19.
Figure 21:
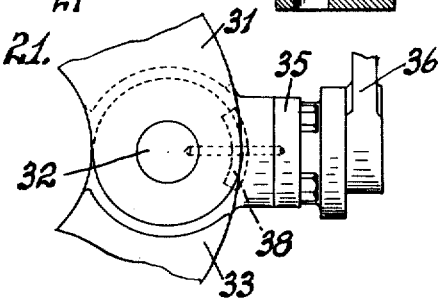
Fig. 21 is a fragmentary plan view of the actuating means shown in Fig. 19.

Another means of moving the locking jaw vertically relative to the other jaws in the tongs is illustrated in Figs. 19 to 21, inclusive. The inner jaw 31 is bifurcated and the pin 32 is fixedly mounted therein. The locking jaw 33 is slidably mounted on the pin 32. A shaft 34 is journaled in a plate 35 which plate is fixedly attached to the jaw 31. A handle 36 is secured to the shaft 34 for the purpose of rotating this shaft. A cam 37 on the inner end of the shaft 34 fits into an elongated cam groove 38. The cam groove is formed in the jaw 33. Thus, by rotating the shaft 34, the jaw 33 will be raised or lowered for the purpose of moving a locking finger into a disengaged position.

My invention resides wholly in the combinations disclosed which include my novel latching mechanism, two forms of which are illustrated and above described. In the first form, best illustrated in Fig. 1, I employ a first member 7 having a projection 13 adapted to engage the surface of a projection 14 formed on a second member 6. In the second form, best illustrated in Fig. 16, a first member 28 is provided with pins 29 which engage the surface surrounding holes 27 in a second member 23. In both cases the projection is caused to engage and disengage the surface for the purpose of locking together or freeing the free ends of the pipe-engaging means by a vertical movement; that is, by a movement which is along a line substantially parallel to the axis of the pipe 101 and to the axes of the pins 102 and 103. In other words, a vertical movement of the projection 13 or 29 with relation to the surface it engages is used to lock or free the ends of the pipe-engaging means.

Some manually operable means should preferably be supplied by which an operator may cause this locking or freeing of the ends of the pipe-engaging means. The manually operable means operated by the handles 11, 26, or 36 are merely convenient means for accomplishing this purpose.

It will be seen that my invention relates particularly to tongs, such as are shown, which are adapted to grip a cylindrical body, such as the pipe 101, by means of pipe-engaging means, such as the jaws 21, 24, and 22 and 23. These pipe-engaging means are pivotally mounted on the handle 1 on suitable pins 102 and 103 and are free to swing about the axes of these pins so that they will engage or disengage the pipe 101. A suitable latching mechanism is provided for locking together the free ends of the pipe-engaging means and when these ends are locked together, if the outer end of the handle 1 is pulled in the direction of the arrow 104, the pipe-engaging means grip the pipe and the pipe is turned in a counterclockwise direction, as shown in Fig. 16. Pipe tongs operating in this manner are old in the art and my invention resides wholly in the combinations including the novel latching means described and claimed. This new latching mechanism can be applied to many of the old forms of tongs known in the art and the particular form of handle pivots and pipe-engaging means shown are described merely for illustrative purposes.

Having described my invention, I claim:

1. Pipe tongs comprising a handle, a casing-engaging means connected to the handle, said means comprising oppositely disposed pipe-engaging jaws, said jaws being pivotally attached at one end to the handle, one of said jaws being vertically movable, means detachably connecting the outer swinging ends of the jaws, said last named means including a manually operable means engaging one of the jaws whereby said last named jaw is moved vertically with respect to its inter-engaging jaw.

2. Pipe tongs comprising a handle, a casing-engaging means connected to the handle, said means comprising oppositely disposed series of pivotally connected pipe-engaging jaws, a pair of said jaws being pivotally mounted on the handle, means detachably connecting the outer swinging ends of the jaws, said means including engageable means on one of the jaws, engaging means on the inter-engaging jaw, and means engaging a jaw in one of the oppositely disposed symmetrical series whereby one of the engaging jaws may be moved vertically relative to the inter-engaging jaw to engage and disengage said engaging means.

3. Pipe tongs comprising a handle, casing-engaging means connected to the handle comprising two oppositely disposed series of pivotally connected jaws, means for detachably connecting the outer swinging jaws of the two series, said last named means comprising engageable means on one of the jaws and engaging means on the other of the jaws, and manually operable means engaging a jaw of one series whereby said jaw may be vertically moved relative to the inter-engaging jaw, thereby engaging and disengaging the detachable connecting means.

4. Pipe tongs comprising a handle, two oppositely disposed series of pivotally connected jaws mounted on the handle, the outer swinging pair of the series of jaws being detachably connected, engageable means on one of the outer jaws, engaging means on the other of the outer jaws, and manually operable means engaging one of the series of connected jaws whereby said jaws may be vertically moved relative to the inter-engaging jaw to engage and disengage the outer jaws.

5. Pipe tongs comprising a handle, two oppositely disposed series of pivotally connected jaws mounted on the handle, the outer swinging pair of the series of jaws being detachably connected, engageable means on one of the outer jaws, engaging means on the other of the outer jaws and manually operable means engaging one of the outer jaws whereby the outer jaw may be vertically moved relative to the inter-engaging jaw to engage and disengage said outer jaws.

6. Pipe tongs comprising a handle, a casing-engaging means connected to the handle comprising two oppositely disposed series of pivotally connected jaws, means for detachably connecting the outer swinging jaws of the two series, said last named means comprising engageable means on one of the outer jaws and engaging means on the other of the outer jaws, and manually rotatable cam means engaging a jaw of one series whereby one of said outer jaws may be vertically moved relative to the inter-engaging jaw, thereby engaging and disengaging the detachable connecting means.

7. In a pipe tongs adapted to rotate a pipe for the purpose of screwing it into or unscrewing it from a coupling, said tongs including a handle and first and second pipe engaging means pivoted to the handle and adapted to encircle and grip the pipe when constricted about the pipe, such constriction of the pipe engaging means and rotation of the pipe being accomplished by applying a force to the free end of said handle, said pipe tongs being old and well known in the art in which they operate in the manner above specified, a new and useful means of detachably securing together the free ends of said pipe engaging means comprising: a latching member pivoted on said first pipe engaging means in such a manner that it can swing about the center of said pivot and also move in the direction of the axis of said pivot from a first extreme axial position to a second extreme axial position; locking means on said second pipe engaging means and on the free or swinging end of said latching member said locking means being mutually engageable in such a manner that said latching member is attached to said second pipe engaging means, and said pipe engaging means can be so constricted, when said latching member is in one extreme axial position, and in the proper radial position, with relation to said pivot, said locking means being entirely disconnected from each other when said latching member is in the other extreme axial position; and means by which an operator can move said latching member from one extreme axial position to the other extreme axial position.

8. In a pipe tongs adapted to rotate a pipe for the purpose of screwing it into or unscrewing it from a coupling, said tongs including a handle and first and second pipe engaging means pivoted to the handle and adapted to encircle and grip the pipe when constricted about the pipe, such constriction of the pipe engaging means and rotation of the pipe being accomplished by applying a force to the free end of said handle, said pipe tongs being old and well known in the art in which they operate in the manner above specified, a new and useful means of detachably securing together the free ends of said pipe engaging means comprising: a latching member pivoted on said first pipe engaging means in such a manner that it can swing about the center of said pivot and also move in the direction of the axis of said pivot from a first extreme axial position to a second extreme axial position; locking means on said second pipe engaging means and on the free or swinging end of said latching member said locking means being mutually engageable in such a manner that said latching member is attached to said second pipe engaging means, and said pipe engaging means can be so constricted, when said latching member is in one extreme axial position, and in the proper radial position, with relation to said pivot, said locking means being entirely disconnected from each other when said latching member is in the other extreme axial position; a cam so placed that it forces said latching member from one of said axial positions to the other of said axial positions; and means by which an operator can actuate said cam.

LEONARD E. VAUGHN.